United States Patent [19]

Okumura et al.

[11] Patent Number: 4,753,842
[45] Date of Patent: Jun. 28, 1988

[54] HEAT-SHRINKABLE BIAXIALLY DRAWN POLYAMIDE FILM AND PROCESS FOR PREPARATION THEREOF

[75] Inventors: Tsuguo Okumura, Ibaraki; Kazuharu Abe; Kenji Mori, both of Tsuchiura, all of Japan

[73] Assignee: Mitsubishi Monsanto Chemical Company, Tokyo, Japan

[21] Appl. No.: 850,749

[22] Filed: Apr. 11, 1986

[51] Int. Cl.$^4$ .................. B32B 27/34; B29D 7/22
[52] U.S. Cl. .................. 428/220; 264/177.19; 264/211.12; 264/290.2; 428/474.4; 428/913
[58] Field of Search .......... 428/474.4, 474.7, 220, 428/913; 264/177.19, 211.12, 290.2

[56] References Cited

U.S. PATENT DOCUMENTS 4,525,414  6/1985  Ohya et al. .................. 428/474.4
4,618,528  10/1986  Sacks et al. .................. 428/474.4 X

*Primary Examiner*—Thomas J. Herbert
*Attorney, Agent, or Firm*—Burgess, Ryan & Wayne

[57] ABSTRACT

Disclosed is a heat-shrinkable biaxially drawn polyamide film which is formed from a homopolymer or copolymer of ε-caprolactam or a polyblend thereof, by a sequential biaxial drawing method and which has a density of 1.129 to 1.136 g/cm$^3$ and an in-plane orientation index of 0.0535 to 0.0580. This film is prepared by the steps of drawing in the machine direction a substantially amorphous unoriented polyamide film at 45° to 65° C., a deformation rate of at least 10,000%/min and a draw ratio of 2.7 to 3.5 by a roll type longitudinal drawing method, gripping the ends of the film by tenter clips, drawing the film in the transverse direction at a film temperature not higher than 100° C., an average deformation rate of 2,000 to 10,000%/min and a draw ratio of 3 to 5, and heat-treating the film at 125° to 170° C. while gripping the ends of the film by the tenter clips.

9 Claims, No Drawings

HEAT-SHRINKABLE BIAXIALLY DRAWN POLYAMIDE FILM AND PROCESS FOR PREPARATION THEREOF

BACKGROUND OF THE INVENTION

1. Field of the Invention

The present invention relates to a heat-shrinkable biaxially drawn polyamide film and a process for the preparation thereof. More particularly, it relates to a heat-shrinkable biaxially drawn polyamide film suitable for shrink-packaging processed meat products, such as ham and sausage, daily necessities, and groceries.

2. Description of the Related Art

Heat-shrinkable polyamide films formed from a nylon 6 homopolymer by the tubular film simultaneous biaxial drawing method are in practicle use, but these films have an unsatisfactory thickness accuracy and production rate or productivity.

Furthermore, films prepared from a starting material composed mainly of a polycondensation polymer of metaxylenediamine and an aliphatic carboxylic acid by the tenter type sequential biaxial drawing method are in practicle use. However, since a special starting material must be used, the manufacturing cost is high.

Other processes are proposed in Japanese Unexamined Patent Publications No. 56-49,226, No. 57-170,720, and NO. 58-78,728. However, these processes have a problem in that a special starting material must be used.

SUMMARY OF THE INVENTION

It is the primary object of the present invention to provide a film which is formed of a polyamide manufactured in a large quantity on an industrial scale and has a well-balanced thermal shrinkability, and a process for preparing this film industrially advantageously.

In accordance with one aspect of the present invention, there is provided a heat-shrinkable biaxially drawn polyamide film which is formed of a homopolymer or copolymer of ε-caprolactam, or a polyblend thereof by a sequential biaxial drawing method and which has a density of 1.129 to 1.136 g/cm$^3$ and an in-plane orientation indexes of 0.0535 to 0.0580.

In accordance with another aspect of the present invention, there is provided a process for the preparation of this heat-shrinkable polyamide film, which comprises drawing in the machine direction a substantially amorphous unoriented polyamide film at a temperature of 45° to 65° C., a deformation rate of at least 10,000%/min and a draw ratio of 2.7 to 3.5 by a roll type longitudinal drawing method, gripping the ends of the film by tenter clips, drawing the film in the transverse direction at a film temperature not higher than 100° C., an average deformation rate of 2,000 to 10,000%/min and a draw ratio of 3 to 5, and heat-treating the film at a temperature of 125° to 170° C. while gripping the edges of the film by the tenter clips.

DESCRIPTION OF THE PREFERRED EMBODIMENTS

The polyamide used in the present invention is a homopolymer of ε-caprolactam, a copolymer comprising ε-caprolactam as the main component and 2 to 10 mole %, preferably 2 to 5 mole %, of another compound copolymerizable therewith, or a blend of this homopolymer and/or this copolymer with 5 to 20% by weight of a compatible polymer.

As the compound copolymerizable with ε-caprolactam, there can be mentioned mixtures of aliphatic and aromatic diamines with aliphatic and aromatic dicarboxylic acids. As specific examples of the diamine, there can be mentioned ethylenediamine, tetramethylenediamine, pentamethylenediamine, hexamethylenediamine, octamethylenediamine, decamethylenediamine, metaxylylenediamine, and paraxylene diamine. As specific examples of the dicarboxylic acid, there can be mentioned adipic acid, sebacic acid, cork acid, glutaric acid, azelaic acid, β-methyladipic acid, terephthalic acid, isophthalic acid, decamethylene-dicarboxylic acid, dodecamethylene-dicarboxylic acid, and pimelic acid.

As the comonomer preferred from the industrial viewpoint, and in view of the rate of crystallization at the film-forming step and the degree of crystallization, there can be mentioned a salt of hexamethylenediamine with terephthalic acid, a salt of hexamethylenediamine with adipic acid, a salt of ethylenediamine with terephthalic acid, and salt of ethylenediamine with isophthalic acid.

In the process of the present invention, a substantially amorphous unoriented polyamide film (hereinafter referred to as "undrawn film") is used. The undrawn film may be prepared, for example, by heating and melting a polyamide by an extruder, extruding the melt in the form of a film from a T-die, and quenching the extrudate on a casting roll maintained at a temperature not higher than 40° C., preferably not higher than 35° C. but higher than the dew point, according to known casting methods such as the air knife casting method, the electrostatic casting method, or the vacuum chamber method.

According to the process of the present invention, the undrawn film is drawn in the machine direction (hereinafter referred to as "longitudinal drawing") by the roll type longitudinal drawing method. By the roll type longitudinal drawing is meant the longitudinal drawing using a roll type longitudinal drawing machine. In the present invention, a known roll type high-speed longitudinal drawing machine may be used.

When the undrawn film is drawn in the machine direction, it is preferred that the undrawn film be heated and the temperature be adjusted to 45° to 65° C. in advance.

If the temperature of the undrawn film is lower than 45° C., longitudinal drawing unevenness is readily caused in the film drawn in the machine direction. If the temperature of the undrawn film is higher than 65° C., the film is apt to adhere to the roll surface, and also in this case, longitudinal drawing unevenness is readily caused in the film drawn in the machine direction. Furthermore, hydrogen bonds oriented in the drawn direction are formed and, therefore, at the subsequent drawing in the transverse direction (hereinafter referred to as "transverse drawing"), transverse drawing unevenness is caused or an undrawn portion is formed and the film is readily torn.

At the longitudinal drawing step, it is indispensable to adopt drawing conditions such that the rate of deformation is at least 10,000%/min and the draw ratio is 2.7 to 3.5.

By the rate of deformation is meant a value calculated according to the following formula (I):

$$V_{MD} = \frac{(X-1)}{L} \times \frac{U_L + U_M}{2} \times 100 \qquad (I)$$

wherein $V_{MD}$ represents the rate (%/min) of deformation in the machine direction, X represents the draw ratio determined by $U_H/U_L$, L represents the length (m) of the drawing zone in the machine direction, $U_L$ represents the linear speed (m/min) of a low-speed roll, and $U_H$ represents the linear speed (m/min) of a high-speed roll.

If the rate of deformation ($V_{MD}$) is lower than 10,000%/min, even though the longitudinal drawing is carried out in good conditions, transverse drawing unevenness is readily caused in the film at the subsequent transverse drawing. If the rate of deformation is at least 10,000%/min, the longitudinal drawing can be performed in good conditions and no transverse drawing unevenness is caused at the subsequent transverse drawing. The upper limit of the rate of deformation may be determined according to the structure of the apparatus used, the film temperature at the time of initiation of the drawing, and other factors. It is generally preferred that the rate of deformation be up to 50,000%/min.

When the film temperature is low at the start of the drawing, a lower rate of deformation is preferably selected within the above-mentioned range, and when the film temperature is high at the start of the drawing, a higher rate of deformation is preferably selected within the above-mentioned range.

If the longitudinal draw ratio is lower than 2.7, it is impossible to impart a desired orienting effect to the finally obtained film. If the draw ratio is higher than 3.5, at the subsequent transverse drawing, transverse drawing unevenness is readily caused or an undrawn portion is formed, and the film is likely torn. The longitudinal draw ratio may be changed by changing the linear speeds of the high-speed and low-speed rolls in the roll type longitudinal drawing machine.

According to the process of the present invention, the temperature of the film drawn in the machine direction under the above-mentioned conditions is immediately adjusted to 45° to 60° C., and the film is transferred to the position for initiation of the transverse drawing (the position where the tenter rail begins to open) within a time represented by the following formula (II):

$$t = e^{(3.9 - 0.053 T_1)} \qquad (II)$$

wherein t represents the time (seconds) between the point of completion of the drawing in the machine direction e means the base of natural logarithm, and the point of initiation of the drawing in the transverse direction, and $T_1$ represents the film temperature during this time, which is selected within the range of from 45° to 60° C.

The reason why the temperature of the film is adjusted within the range of from 45° to 60° C. after completion of the longitudinal drawing is as follows. If the film temperature is lower than 45° C., the temperature is too low for the transverse drawing and the film is readily torn. If the film temperature is higher than 60° C., since the time for the transfer of the film to the position for initiation of the transverse drawing after completion of the longitudinal drawing is too short, it is necessary to extremely shorten the distance between the longitudinal drawing machine and the transverse drawing machine or extremely shorten the length of a film-introducing portion (film-gripping portion) of the transverse drawing machine, and problems arise in connection with the design and arrangement of the apparatus and the operation.

If the rate of deformation is higher than 5,000%/min at the longitudinal drawing step, heat is generated during the drawing and the film temperature is elevated to some extent (by 10° to 20° C.). Accordingly, in order to control the film temperature within the range of from 45° to 60° C., it is sometimes necessary to cool the film.

The film drawn in the machine direction is transferred to the subsequent transverse drawing step. In the case of a polyamide, since the rate of crystallization is high, the hydrogen bonds in the longitudinally drawn film become strong with the lapse of time. Therefore, it is not permissible to adopt a method in which the film drawn in the machine direction is quenched and is heated again to a drawing-possible temperature in a pre-heating zone of the transverse drawing machine. Accordingly, it is preferable to adopt a method in which the film is transferred in a short time at a drawing-possible temperature as low as possible while controlling the strengthening of the hydrogen bonds.

As the result of experiments made by us, it was found that it is preferred that the film drawn in the machine direction be transferred to the subsequent transverse drawing step within the time calculated according to the above-mentioned formula (II). More specifically, it was found that if the temperature of the longitudinally drawn and temperature-adjusted film is 45° C., the time t should be within 4.5 seconds, if the film temperature is 50° C., the time t should be within 3.5 seconds, and if the film temperature is 60° C., the time t should be within 2.1 seconds. If the transfer time exceeds the time calculated according to the formula (II), transverse drawing unevenness is readily caused in the film at the subsequent transverse drawing step, or an undrawn part is often formed in the edge portion of the film in the transverse direction.

According to the process of the present invention, the film drawn in the machine direction is transferred to the transverse drawing step, and it is preferred that the thickness profile of the film at the position for initiation of the transverse drawing be such that the thickness is gradually reduced from the end portion in the transverse direction toward the end portion in the transverse direction, and the thickness of the central portion in the transverse direction of the film is 75 to 90% of the thickness in the end portion in the transverse direction (the portion held by the tenter clip).

The reason why the above-mentioned thickness profile is given to the film at the position for initiation of the transverse drawing is that occurrence of necking in the vicinity of the tenter clip is controlled (so as to avoid tearing of the film) and the position of occurrence of neck drawing in the central portion in the transverse direction of the film is made random (so as to prevent formation of a specific fixed thickness profile in the drawn film by making the neck drawing-occurring position random).

In the process of the present invention, when the transverse drawing is carried out by the tenter type transverse drawing method, it is preferred that until the set draw ratio between the tenter clips exceeds 1.4, the width be expanded while controlling the expanding angle to the central line perpendicular to the transverse direction of the film within 6°, and that during this period, the temperature $T_2$ of the tenter clips be kept at a level lower than the temperature $T_1$ mentioned with regard to the formula (II).

The reason for adoption of the above conditions just before initiation of the transverse drawing is that occurrence of necking in the vicinity of the tenter clip is controlled (so as to avoid tearing of the film) and the position of occurrence of neck drawing in the central portion in the transverse direction of the film is made random (so as to prevent formation of a specific fixed thickness profile in the drawn film by making the neck drawing-occurring position random).

When the transverse drawing is carried out by using the tenter, the film temperature should preferably be elevated stepwise from the position for initiation of the transverse drawing so that at the position of completion of the transverse drawing the film temperature is not higher than 100° C., preferably 70° to 100° C., and more preferably 75° to 90° C.

In the film drawn in the machine direction by the above-mentioned method, hydrogen bonds oriented in the drawn direction become strong with the lapse of time, and therefore, the film is transferred to the position for initiation of the transverse drawing in a very short time and the transverse drawing is started. The film temperature at this point, that is, 45° to 60° C., is too low for the transverse drawing. If the transverse drawing is carried out at this temperature, the film is readily torn at the tenter clip and it is difficult to perform the transverse drawing stably.

In order to perform the transverse drawing stably and obtain a film in which the orientation in the machine direction is relatively well-balanced, as pointed out hereinbefore, the specific thickness profile is given to the film subjected to the transverse drawing, the width expansion angle between the tenter clips at the initial stage of the transverse direction is specified, the point of initiation of neck drawing occurring in the central portion in the transverse direction of the film is made random and the transverse drawing is carried out while elevating the film temperature stepwise. If the film temperature is abruptly elevated at the transverse drawing step, the portion of the film where neck drawing is not initiated, that is, the portion of the film which is not drawn in the transverse direction, receives strong heat and hence, the oriented strong hydrogen bonds formed at the longitudinal drawing step become strong. Accordingly, if this film is drawn in the transverse direction, transverse drawing unevenness is caused or an undrawn portion is formed, and in order to avoid this disadvantage, the draw ratio in the transverse direction should be increased. In this case, in the obtained film, the orientation in the machine direction is not well-balanced with the orientation in the transverse direction.

In the case where a film is drawn in the transverse direction by a tenter, if the film temperature is elevated stepwise from the position of initiation of the transverse drawing so that at the position of completion of the transverse direction the film temperature is not higher than 100° C., preferably 70° to 100° C., and more preferably 75° to 90° C., the strengthening of the hydrogen bonds is controlled and disappearance of the neck drawing is caused at an early stage of the transverse direction, with the result that a film having a good orientation balance and a high thickness uniformity can be prepared stably.

As means for elevating the temperature stepwise at the transverse drawing step, there may be adopted a method in which at least two sections orthogonal to the direction of advance of the film are formed above and/or below the film and hot air is blown into the respective sections, and a method in which an infrared heater is disposed in each of the above section. Furthermore, the above-mentioned two methods may be adopted in combination.

It is preferred that the temperature of the film at the position of completion of the transverse direction be 70° to 100° C. However, in the case where the rate of deformation and draw ratio of the film are high, a higher film temperature is selected within the above-mentioned range, and when the rate of deformation and draw ratio are low, a lower film temperature is selected within the above-mentioned range.

At the transverse drawing step, it is necessary to adopt drawing conditions such that the average rate of deformation is 2,000 to 10,000%/min and the draw ratio is 3 to 5, preferably 3.5 to 4.5.

By the average rate of deformation is meant a value calculated according to the following formula (III):

$$V_{TD} = \frac{(Y-1)}{L_T} \times U_T \times 100 \qquad (III)$$

wherein $V_{TD}$ represents the transverse deformation rate (%/min) of the film, Y represents the mechanically set draw ratio of the film, which is determined by $y_2/y_1$ in which $y_1$ means the tenter width at the position of initiation of the transverse drawing and $y_2$ means the tenter width of the position of completion of the transverse drawing, $U_T$ represents the speed (m/min) of the tenter, and $L_T$ represents the length of the zone of the transverse drawing.

If the average rate of deformation ($V_{TD}$) is lower than 2,000%/min, transverse drawing unevenness is readily caused. If the average rate of deformation is higher than 10,000%/min, the film is often torn.

If the transverse draw ratio is lower than 3, an undrawn portion is often left in the film and good results cannot be obtained.

According to the process of the present invention, the film which has been sequentially biaxially drawn in the above-mentioned manner is heat-treated at a temperature of 125° to 170° C. while the end portions of the films are gripped by the tenter clips. If the heat treatment temperature is lower than 125° C., the heat treatment is insufficient, and the flatness of the film is poor or a trouble such as natural shrinkage at room temperature takes place. If the heat treatment temperature is higher than 170° C., the heat treatment becomes excessive and the obtained film has an insufficient shrinkability. It is especially preferred that the heat treatment be carried out at a temperature of 130° to 160° C.

The heat treatment time is appropriately selected according to the treatment temperature and the intended shrinkability to be imparted to the film. The heat treatment may be carried out under tension and/or under relax of less than 10% in the transverse direction.

It is preferred that the thickness of the biaxially drawn film obtained according to the above-mentioned process be 10 to 50 μm. Adjustment of the thickness of the drawn film within the above-mentioned range may be accomplished by appropriately selecting the thickness of the undrawn film while taking the draw ratios in the machine and transverse directions into consideration.

In order to attain the objects of the present invention, it is indispensable that the density of the biaxially drawn film should be 1.129 to 1.136 g/cm³ and the in-plane orientation index should be 0.0535 to 0.0580.

If the density of the film is lower than 1.129 g/cm³, this indicates an insufficient heat treatment an the film is naturally shrunk when the film is allowed to stand at room temperature. If the density exceeds 1.136 g/cm³, this means an excessive heat treatment and the shrikability of the film is too low. If a film having a density of 1.129 g/cm³ is immersed in boiling water, the film is shrunk by about 30%. If a film having a density of 1.134 g/cm³ is similarly tested, the film is shrunk by about 16%.

The in-plane orientation index is a value comparing the molecular orientation of the film in the plane of the film with the molecular orientation of the film in the thickness direction of the film, which is calculated according to the following formula:

$$\text{in-plane orientation index} = \frac{X+Y}{2} - Z$$

wherein X represents the refractive index in the machine direction (longitudinal direction) of the film, Y represents the refractive index in the transverse direction (lateral direction) of the film, and Z represents the refractive index in the thickness direction of the film.

Note, each of the refractive indexes mentioned above is measured by the Abbe refractometer.

Generally, a larger value of the in-plane orientation index means a larger orientation in the plane. In the case of a crystalline polymer, however, the refractive index depends on the amplitude of the orientation, and also the refractive index is increased when the crystallization of the film is advanced. In short, the measured value of the refractive index of the film is a mean value of the refractive index of the crystal portion and the refractive index of the amorphous portion. Therefore, in the case of a crystalline polymer, a large in-plane orientation index of the film does not always indicate a higher thermal shrinkability of the film, but this may be a fair yardstick.

It is essential that the in-plane orientation index be in the range of 0.0535 to 0.0580. If the value of the in-plane orientation index is smaller than 0.0535, the orientation of the film is insufficient, and the film does not show a high thermal shrikability or a problem arises in practical application because the film is naturally shrunk when it is allowed to stand at room temperature. If the value of the in-plane orientation index is larger than 0.0580, the heat treatment, rather than the orientation, is excessive and the crystallization is excessively advanced, and therefore, the obtained film has a low shrinkability.

The film of the present invention is suitable for shrink-packaging processed meat products, such as ham and sausage, daily necessities, and groceries.

The present invention attains the excellent effects described below and the film has a great utility value from the industrial viewpoint.

(1) The thermal shrinkage factor of the film of the present invention is within a preferred range of from 15 to 30%.

(2) In the process of the present invention, a polymer industrially available at a low cost is used as the starting material and a film is formed by the sequential biaxial drawing method, and therefore, the manufacturing cost is low.

(3) In the process of the present invention, since a good orientation balance is readily attained in the film during preparation, a film having a well-balanced thermal shrinkability can be obtained.

(4) In the process of the present invention, since bowing phenomenon rarely occurs during the preparation, a good product can be obtained along the entire tenter clip width at the transverse drawing.

The present invention will now be described in detail with reference to the following examples that by no means limit the scope of the invention.

EXAMPLE 1

Poly-ε-capramide having a relative viscosity of 3.5 (Novamid 1020CA supplied by Mitsubishi Chem. Ind. Ltd.) was kneaded at a cylinder temperature of 260° C. in an extruder having a screw diameter of 90 mm and extruded in the form of a film through a T-die. The extrudate was quenched on a casting roll having a diameter of 600 mm, which was cooled to 35° C., to obtain a substantially amorphous (undrawn) film having a thickness of about 150 μm and a width of about 350 mm.

This undrawn film was guided at a delivery speed of 8 m/min to a longitudinal drawing machine comprising a plurality of rolls having a diameter of 150 mm and a width of 700 mm, and the film temperature was adjusted to 50° C. by heating and the film was drawn in the machine direction at a rate of deformation of 14,700%/min and a draw ratio of 3.1 between rolls differing in the peripheral speed.

By rolls arranged subsequently to the longitudinal drawing zone, the temperature of the longitudinally drawn film was immediately adjusted to 45° C. and the film was transferred to the position of initiation of the transverse drawing in a tenter type transverse drawing machine having a width of 1.5 m and a length of 20 m over a period of 3.5 seconds.

The film transferred to this position had a thickness of 80 μm in the portions held by the clips and 68 μm in the central portion in the transverse direction of the film, and the thickness in the central portion corresponded to 85% of the thickness in the portions held by the clips.

The tenter clips of the tenter type transverse drawing machine were cast in tenter rails and a water-cooling pipe was embedded therein to circulate cooling water therethrough. The transverse drawing zone was equidistantly divided into three sections, and a hot air blowout nozzle was arranged in each section so that the temperatures of the respective sections could be independently controlled.

Both the ends of the longitudinally drawn film were gripped by the tenter clips cooled to 40° C., and the tenter rails were expanded by 5° to the central line in the transverse direction of the film to the position of a draw ratio of 2.0 and the film was drawn in the transverse direction at an average rate of deformation of 3,000%/min and a draw ratio of 4.7. In the transverse drawing zone, the film temperature was 60° C. at the first section, 70° C. at the second section, and 80° C. at the third section.

The transversely drawn film was sequentially heat-treated at 130° C. at a constant width for 2 seconds while both ends of the films were gripped by the tenter clips, and the film was then heat-treated at 130° C. for 2 seconds while the film was relaxed by narrowing the distance between the tenter rails by 5%. Thus, the heat treatment was conducted two times.

The heat-treated film was cooled and both the selvedges were cut off, and the film was wound by a winder to obtain a biaxially drawn film having a thickness of about 15 μm.

Physical properties of the obtained film were evaluated according to methods described below. The obtained results are shown in Table 1.

(a) Thermal Shrinkage Factor (%)

A square specimen having a side of 100 mm was sampled from the film, and the specimen was placed in an atmosphere maintained at a temperature of 25° C. and a relative humidity of 40% and mark lines were drawn at intervals of 80 mm. The specimen was immersed in boiling water for 5 minutes and taken out. The specimen was allowed to stand in an atmosphere maintained a temperature of 25° C. and a relative humidity of 40% for 24 hours, and the change ($\Delta l_1$) between the mark lines was measured and the thermal shrinkage factor was calculated according to the following formula:

$$\text{thermal shrinkage factor} = \frac{\Delta l_1}{80} \times 100$$

(b) Density

The density was measured by a density gradient tube of the carbon tetrachloride/toluene type according to the method of JIS K-6810.

(c) In-Plane Orientation Index and Balance Degree

By using the Abbe refractometer, the refractive index (x) in the machine direction (longitudinal direction) of the film, the refractive index (y) in the transverse direction (lateral direction) of the film and the refractive index (z) in the thickness direction of the film were measured, and the in-plane orientation index and balance degree were calculated according to the following formulae:

$$\text{balance degree} = |x - y|$$

$$\text{in-plane orientation degree} = \frac{x + y}{2} - z$$

EXAMPLES 2 and 3

The same undrawn film as used in Example 1 was biaxially drawn in the same manner as described in Example 1.

After the transverse drawing, the film was heat-treated at 150° C. (Example 2) or 170° C. (Example 3) for 3 seconds at a constant width while holding the film by the tenter clips and was then heat-treated at 150° C. (Example 2) or 170° C. (Example 3) for 2 seconds in the state where the film was relaxed by narrowing the distance between the tenter rails by 5%. Thus, the heat treatment was conducted two times.

The heat-treated film was cooled and both the selvedges of the film were cut off, and the film was wound on a winder to obtain a biaxially drawn film having a thickness of about 15 μm.

The physical properties of the obtained film were determined according to the methods described in Example 1. The obtained results are shown in Table 1.

EXAMPLE 4

A biaxially drawn film was formed in the same manner as described in Example 1 except that a film of a poly-ε-capramide copolymer having a relative viscosity of 3.5 and comprising a salt of 95 mole % of ε-caprolactam and 5 mole % of hexamethylene diammonium terephthalate was used as the undrawn polyamide film.

The drawn film was subsequently heat-treated at 160° C. for 2 seconds at a constant width while holding the films by the tenter clips, and was then heat-treated at 160° C. for 2 seconds while relaxing the film by narrowing the distance between the tenter rails by 5%.

The heat-treated film was cooled and both the selvedges were cut off, and the film was wound by a winder to obtain a biaxially drawn film having a thickness of about 15 μm.

The physical properties of the obtained film were determined according to the methods described in Example 1. The obtained results are shown in Table 1.

COMPARATIVE EXAMPLES 1 and 2

The same undrawn film as used in Example 1 was biaxially drawn in the same manner as described in Example 1.

After the transverse drawing, the film was heat-treated at 120° C. (Comparative Example 1) or 180° C. (Comparative Example 2) for 2 seconds at a constant width while holding the film by the tenter clips, and was then heat-treated at the same temperature for 2 seconds while relaxing the film by 5%.

In the same manner as described in Example 1, the treated film was wound by a winder.

The physical properties of the obtained film were measured according to the methods described in Example 1. The obtained results are shown in Table 1.

When the film obtained in Comparative Example 1 was allowed to stand in a room maintained at a temperature of 25° C. and a relative humidity of 55% for 3 days, the film was naturally shrunk by about 3% in both the machine and transverse directions.

The thermal shrinkage factor of the film obtained in Comparative Example 2 was as low as 7%, and this film was not suitable as a heat-shrinkable film.

TABLE 1

|  | Example No. | | | | Comparative Example No. | |
|---|---|---|---|---|---|---|
|  | 1 | 2 | 3 | 4 | 1 | 2 |
| Heat treatment temperature (°C.) | 130 | 150 | 170 | 160 | 120 | 180 |
| Thermal shrinkage factor (%) | | | | | | |
| Machine direction | 30 | 24 | 17 | 21 | 33 | 7 |
| Transverse direction | 29 | 24 | 16 | 21 | 33 | 6 |
| Density (g/cm$^3$) | 1.129 | 1.132 | 1.136 | 1.134 | 1.127 | 1.138 |
| In-plane orientation index | 0.0540 | 0.0565 | 0.0578 | 0.0568 | 0.0532 | 0.0592 |
| Balance degree | 0.0008 | 0.0022 | 0.0035 | 0.0026 | 0.0010 | 0.0035 |

The following can be seen from the results shown in Table 1.

In the case of the film of the present invention having a density of 1.129 to 1.136 g/cm³ and an in-plane orientation degree of 0.0535 to 0.0580, the thermal shrinkage factor is within the preferred range (from 15 to 30%), and this film is well-balanced in both the machine direction and the transverse direction.

In contrast, in the case of a film failing to satisfy the requirements of the density and in-plane orientation index specified in the present invention, the shrinkage factor is too high and natural shrinkage occurs even at room temperature (Comparative Example 1), or the shrinkage factor is too low (Comparative Example 2), and the film has an inferior practical utility as a heat-shrinkable film for shrink-packaging or the like.

We claim:

1. A heat-shrinkable biaxially drawn polyamide film, which is formed from a homopolymer derived from ε-caprolactam or a copolymer derived from 90 to 98 mole % of ε-caprolactam and 2 to 10 mole % of at least one copolymerizable monomer, or a polyblend containing 80 to 85% by weight of said homopolymer or copolymer with 5 to 20% by weight of a compatible polymer, by a sequential biaxial drawing method and which has density of 1.129 to 1.136 g/cm³, an in-plane orientation index of 0.0535 to 0.0580, and a thermal shrinkage factor of 15 to 30%.

2. The film according to claim 1, wherein the thickness of the biaxially drawn polyamide film is 10 to 50 μm.

3. A process for the preparation of a heat-shrinkable biaxially drawn polyamide film having a density of 1.129 to 1.136 g/cm³, a thermal shrinkage factor of 15 to 30% and an in-plane orientation index of 0.0535 to 0.0580, which comprises the steps of:

drawing in the machine direction a substantially amorphous unoriented polyamide film at a temperature of 45° to 65° C., a deformation rate of at least 10,000%/min and a draw ratio of 2.7 to 3.5 by a roll type longitudinal drawing method, said unoriented polyamide film being made of a homopolymer derived from ε-caprolactam or a copolymer derived from 90 to 98 mol % of ε-caprolactam and 2 to 10 mole % of at least one copolymerizable monomer, or a polyblend containing 80 to 95% by weight of said homopolymer or copolymer with 5 to 20% by weight of a compatible polymer;

immediately maintaining the film at a temperature of 45° to 60° C. and transferring the film to the position for initiation of the subsequent transverse drawing within a time represented by the following Formula (II):

$$t = e^{(3.9 - 0.053 T_1)} \quad \text{(II)}$$

wherein t represents the time (seconds) between the point of completion of the drawing in the machine direction and the point of initiation of the subsequent drawing in the transverse direction, e represents the base of natural logarithm, and $T_1$ represents the film temperature during this time, which is selected within the range from 45° to 60° C.;

gripping the ends of the film by tenter clips, and drawing the film in the transverse direction at a film temperature not higher than 100° C., an average deformation rate of 2,000 to 10,000%/min, and a draw ratio of 3 to 5; and heat-treating the drawn film at a temperature of 125° to 170° C. while gripping the ends of the film by the tenter clips.

4. The process according to claim 3, wherein the deformation rate in the longitudinal drawing is 10,000 to 50,000%/min.

5. The process according to claim 3, wherein the thickness profile of the film at the position for initiation of the transverse drawing be such that the thickness is gradually reduced from the end portion in the transverse direction toward the central portion in the transverse direction, and the thickness of the film is 75 to 90% of the thickness in the end portion in the transverse direction.

6. The process according to claim 3, wherein until the draw ratio in the transverse direction exceeds 1.4, the film is expanded while controlling the expanding angle to the central line perpendicular to the transverse direction of the film within 6° and maintaining the temperature $T_2$ of the tenter clips at a level lower than the temperature $T_1$ of the film.

7. The process according to claim 3, wherein the film temperature is elevated stepwise from the position for initiation of the transverse drawing so that at the position of completion of the transverse drawing the film temperature is 70° to 100° C.

8. The process according to claim 3, wherein the draw ratio in the transverse drawing is 3.5 to 4.5.

9. The process according to claim 3, wherein the drawn film is heat-treated at a temperature of 130° to 160° C. for one to ten seconds.

* * * * *